United States Patent
Akelbein et al.

(10) Patent No.: US 8,122,268 B2
(45) Date of Patent: Feb. 21, 2012

(54) REDUCING POWER CONSUMPTION OF MIRRORED RAID SUBSYSTEMS

(75) Inventors: Jens-Peter Akelbein, Bodenheim (DE); Rainer Wolafka, Bad Soden (DE)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/175,666

(22) Filed: Jul. 18, 2008

(65) Prior Publication Data

US 2009/0024857 A1    Jan. 22, 2009

(30) Foreign Application Priority Data

Jul. 18, 2007   (EP) .................................... 07112668

(51) Int. Cl.
*G06F 1/32* (2006.01)
(52) U.S. Cl. ........ 713/320; 714/6.23; 711/114; 711/162
(58) Field of Classification Search .................. 713/320; 714/6.23; 711/114, 162
See application file for complete search history.

(56) References Cited

U.S. PATENT DOCUMENTS

| 7,165,160 | B2 * | 1/2007 | Kodama | 711/169 |
| 7,188,292 | B2 * | 3/2007 | Cordina et al. | 714/748 |
| 7,353,406 | B2 * | 4/2008 | Yagisawa et al. | 713/300 |
| 2007/0300013 | A1 * | 12/2007 | Kitamura | 711/114 |

OTHER PUBLICATIONS

Qingbo Zhu "Reducing Energy Consumption of Disk Storage Using Power-Aware Cache Management".
Sudhanva Gurumurthi et al. "Reducing Disk Power Consumption in Servers with DRPM", IEEE Computer Society Dec. 2003, pp. 41-48.
HDD Diet: Power Consumption and Dissipation; http://www.digit-life.com/articles2/storage/hddpower.html; pp. 1-19.
HDD Diet: Power Consumption and Heat Dissipation; http://www.digit-life.com/articles2/storage/hddpower.html; pp. 1-38.

* cited by examiner

*Primary Examiner* — Thuan Du
(74) *Attorney, Agent, or Firm* — John E. Campbell

(57) ABSTRACT

Power consumption reduction of a mirrored RAID storage subsystems is disclosed, wherein data are mirrored to a secondary mirror disk system, the secondary mirror disk system alternates between an operational stage and a power-save stage, wherein data to be mirrored to the secondary mirror disk system is saved in a substantially always operational pre-stage storage if the secondary mirror disk system is in a power save stage and subsequently moved from the pre-stage storage to the secondary mirror disk system when the secondary mirror disk system is operational.

18 Claims, 7 Drawing Sheets

BLOCK ORDERING INCREASES PROPAGATION PERFORMANCE

COMBINING BLOCK ORDERING PLUS STRIPING

STRIPING THE PRE-STAGE STORAGE MEANS ON THE MIRROR DEVICE

REDUCING POWER CONSUMPTION OF MIRRORED RAID SUBSYSTEMS

FIELD OF THE INVENTION

The present invention relates to the field of mirroring electronic data and data replication in general. It relates in particular to a method and system for reducing the power consumption of mirrored RAID storage subsystems, wherein data are mirrored to a secondary mirror disk system.

BACKGROUND OF THE INVENTION

Mirroring and replication of electronic data between two or more disk subsystems is a common method used in prior art to increase the availability of disk storage where business continuity is required.

FIG. 1 illustrates prior art architecture of such system.

A host computer 10 hosts a plurality of business applications 12A, 12B, 12C which should be able to be operated continuously in order to avoid business-critical situations. In order to provide computing resource redundancy, a standby host computer 14 is provided at a failover site which takes the job of host computer 10, if ever this computer's continuous operation should fail.

Common setups in prior art require two or more independent disk arrays 16, 17 respectively. One primary disk area 18 stores all data and is used as the primary storage device. A mirroring or remote copy facility 13 allows synchronizing the data being stored on the primary disk area with the same data being stored on the other secondary, tertiary, etc., disk areas. Asynchronous or synchronous writes are chosen depending on the related recovery point objective abbreviated as RPO in prior art.

The applications 12 storing their data on the primary disk array are notified that the data is written. If the mirroring is carried out asynchronously, the application 12 get notified when the data is stored on the primary disk array. Synchronous writes ensure that the data is also written to disk in the mirror device. A disaster recovery solution based on such architecture requires a redundancy of at least 100% of disk storage so that a "hot device" (i.e., a permanently used primary device) has at least one associated standby device with the same storage capacity.

With the increase of costs for the power consumption required for the disk drives the total cost of ownership (TCO) increases significantly. A typical disk drive in idle mode consumes 6-8.5 Watt increasing up to 9-14 Watt in the case of performing various seeks of the hard disk heads. This is disclosed in "HDD Diet: Power Consumption and Heat Dissipation" by Alex Karabuto (1x@ixbt.com) published Jul. 11, 2005 on the world wide web at digit-life.com/articles2/storage/hddpower.html.

Statistics show that about 27% of the cost for power consumption in IT centers is derived from disk storage. Approaches are already taken in prior art to reduce the power consumption. Introducing pre-stage storage means together with algorithms aware of disk devices and their usage allows reducing the power consumption based on the fact that idle hard disks use less power. This is disclosed in "Reducing Energy Consumption of Disk Storage Using Power-Aware Pre-stage storage means Management" by Qingbo Zhu and Yuanyuan Zhou, Department of Computer Science, UIUC and published on the web at research.ibm.com/aceed/2005/posters/zhu-abstract.pdf.

Another prior art approach changes the rotational speed of the disks itself so that idle hard disks run slower. This is disclosed in "Reducing Disk Power Consumption in Servers using DRPM" by Sudhanva Gurumurthi et al., published on the web at cs.virginia.edu/~gurumurthi/papers/ieee_comp03.pdf.

Other utilities like idle-timeouts for powering down hard disks in workstations or laptops are common practice of prior art.

So, although some investigations and proposals are known in prior art for a general saving of power consumption when operation a hard disk, there is no method known in prior art how to save power in business-critical mirroring storage subsystems. Here, the primary and general policy is to keep the business data safe and accepting a high power consumption of such mirroring systems as unavoidable.

SUMMARY OF THE INVENTION

The objective of the present invention is to provide a method for reducing the power consumption of storage subsystems, wherein data are mirrored from a primary disk subsystem to a secondary mirror disk subsystem without increasing significantly the risk of data loss.

This objective of the invention is achieved by the features stated in enclosed independent claims. Further advantageous arrangements and embodiments of the invention are set forth in the respective subclaims. Reference should now be made to the appended claims.

The above mentioned energy saving scenarios all address primary disk storage being used continuously by applications for storing their data. The present invention discloses the idea that the typical use scenarios using disk storage for replication/mirroring have significantly changed access patterns compared to prior art ordinary usage of disk systems:

Picking up the typical usage properties of mirror storage systems as sketched exemplarily in FIG. 1, a primary disk storage is being accessed by reads and writes of disk blocks while the secondary disk storage only encounters writes to disk blocks which are changed also on the primary storage device. The basic idea of the present invention is now to adopt the operation of the secondary storage device to mirroring-typical access patterns. This results in a new operational mode of the secondary subsystems with a significantly less power consumption without increasing the risk of a data loss.

The present invention discloses to implement a dedicated "pre-stage storage means" which captures all changes of data being sent over the network connecting the primary and the secondary site for a certain period of time. During this period, which is referred to as power save phase, the secondary disk storage is not accessed at all so it can be switched off electrically. After a certain time has been elapsed, or when the pre-stage storage means has been filled up to a certain percentage, the secondary disk storage is turned ON again, and all data being stored in the pre-stage storage means is written to the secondary disk system. Depending on the frequency and amount of changes within the data being stored the pre-stage storage means can be equipped with only a small percentage of the capacity of the secondary disk storage. The range of this percentage will be from 10% to 50% for the most use cases.

Thus, according to the broadest aspect of the invention a method and respective system is disclosed for reducing the power consumption of storage subsystems, wherein data are mirrored from a primary disk subsystem to a secondary mirror disk subsystem, which method is characterised by the steps of:

a) operating the secondary subsystems in an intermittent way comprising operational power-save phases and operational mirroring phases, b) wherein within the power-save phases data which need to be mirrored to the secondary disk subsystem according to a predetermined mirroring policy are mirrored to a pre-stage storage means being controlled to be permanently in operation, c) in response to a predetermined event, e.g., when the pre-stage storage means is filled up to a predetermined degree, or this condition ANDed or ORed with any other useful condition d) moving the pre-stage mirrored data to the secondary subsystem, and e) keeping the secondary subsystem powered down or powered off during the operational power-save phases.

The novel method can be advantageously combined with prior art striping and prior art block ordering.

BRIEF DESCRIPTION OF THE DRAWINGS

The present invention is illustrated by way of example and is not limited by the shape of the FIGs. of the drawings in which.

DETAILED DESCRIPTION OF THE INVENTION

Figure 1:
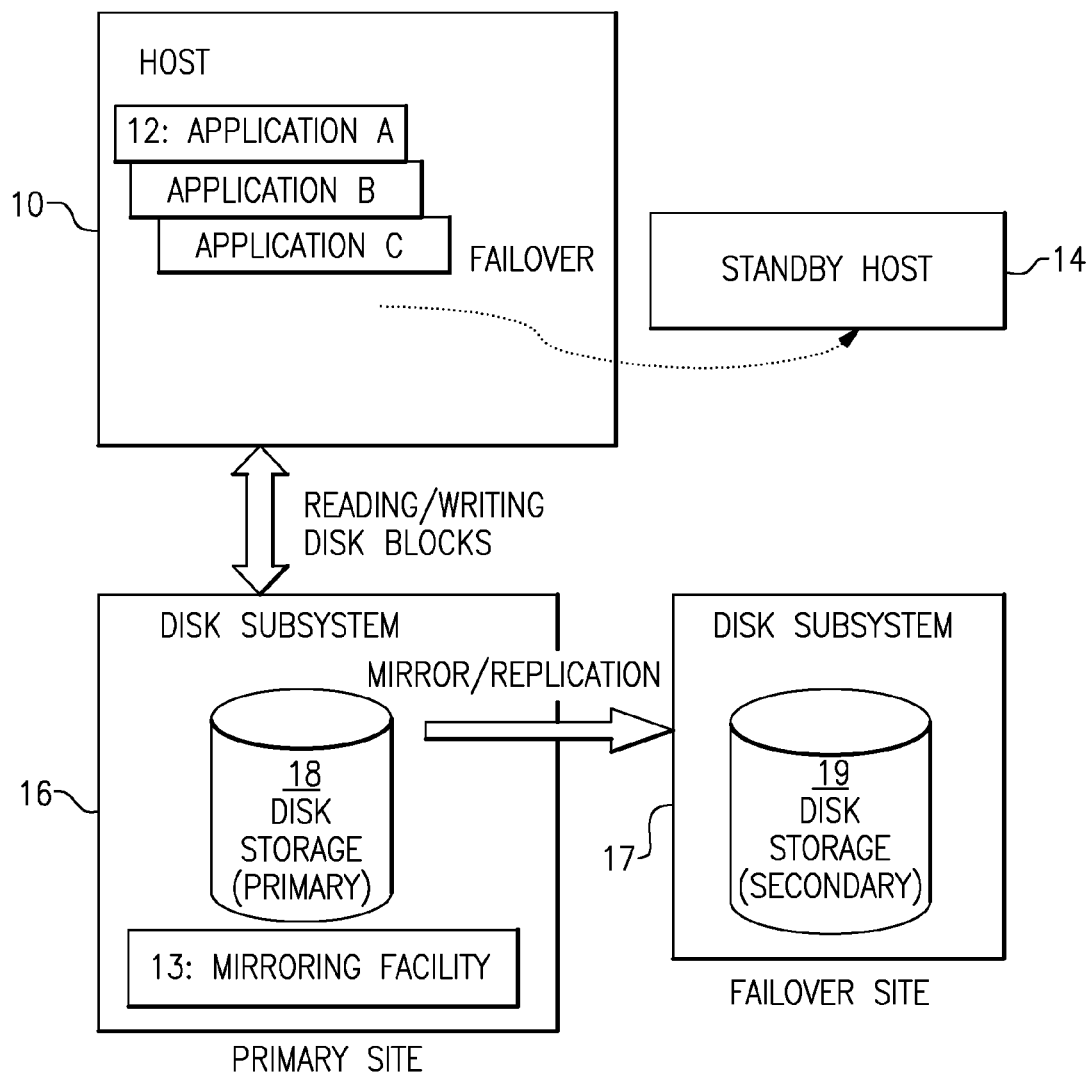
FIG. 1 illustrates the most basic structural components of a prior art hardware and software environment used for a prior art method.
Figure 2:
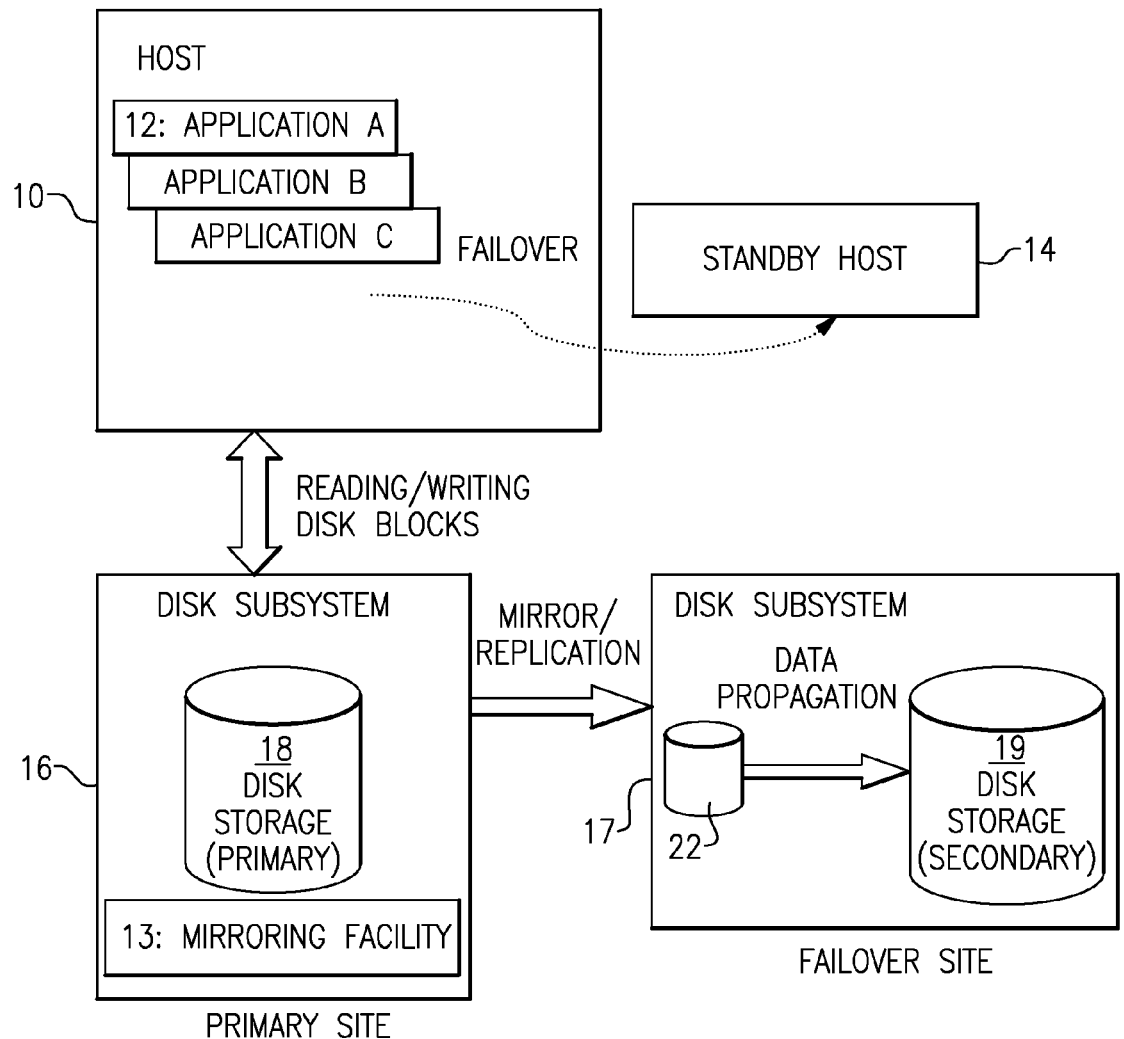
FIG. 2 illustrates the most basic structural components of a novel hardware and software environment used according to the novel method.
Figure 3:
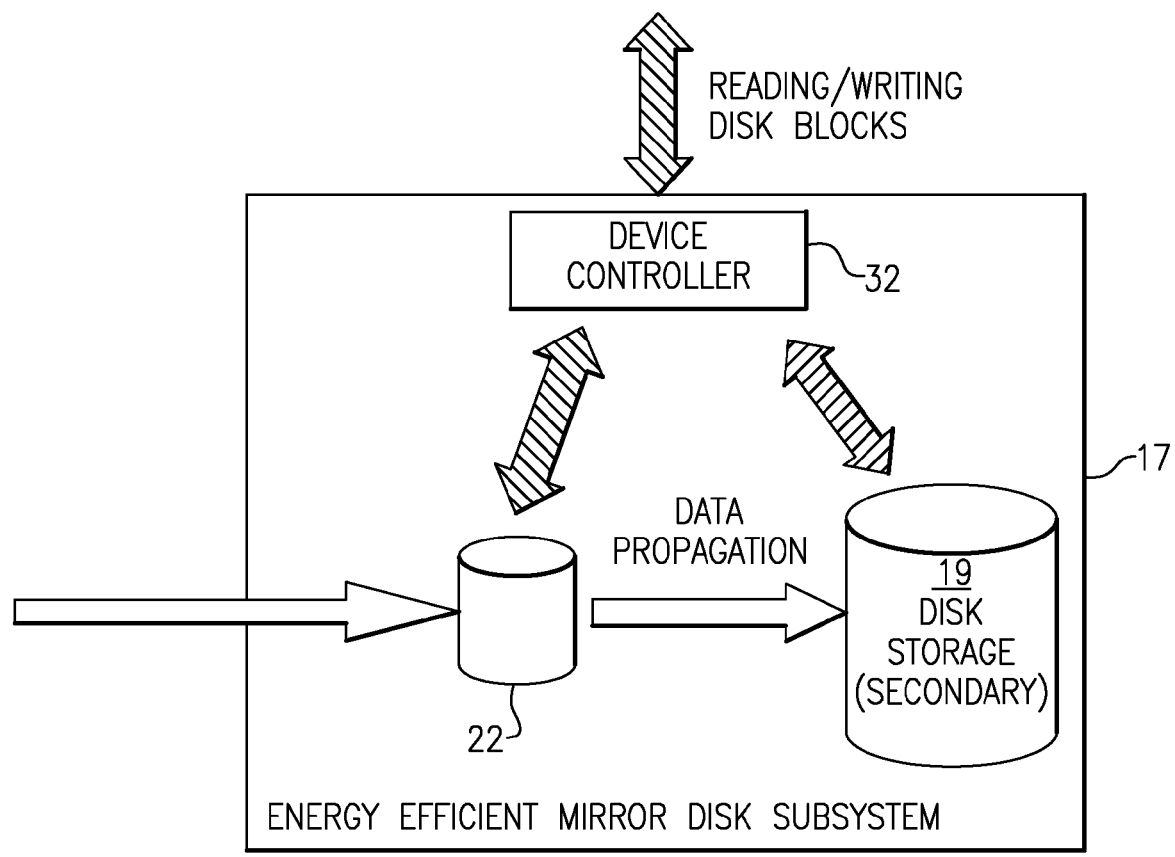
FIG. 3 shows a typical implementation of a Disk Subsystem carried out with an novel Mirror Disk Pre-stage storage means, including a respective storage device controller.

FIGS. 2 and 3 show a typical implementation of a Disk Subsystem carried out with an novel Mirror Disk Pre-stage storage means 22. A reasonable implementation for this storage means is a hard disk, or, depending on a respective use case a disk array, at least smaller in size than the secondary storage system. This system may also include separate RAID facility. A respective novel device controller 32 implements the control method used by the invention.

Figure 4A:
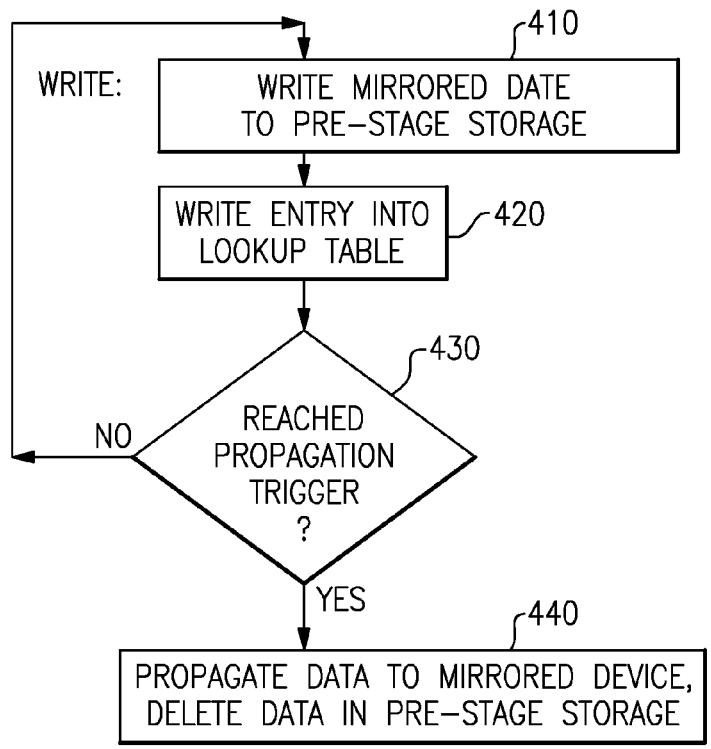
FIGS. 4A-4B illustrate the control flow of the most important steps of a preferred embodiment of the novel method.

The control flow implemented within the device controller 32 and used instead the write processes of prior art mirroring is depicted in FIG. 4:

In the usual mode of operation, referred to as "power save phase" the data gets mirrored from the primary site and is stored in the Mirror Disk Pre-stage storage means 22 first, see step 410. A respective entry in a lookup table is created in step 420 which stores which data has been stored at which storage location in the Mirror Disk Pre-stage storage means 22. Then, a check 430 is performed repeatedly, wherein the condition is tested, if a predetermined trigger event is TRUE or NOT TRUE.

An example for such trigger event is that the storage capacity of the pre-stage storage means 22 is elapsed up to say 75% for example, if typical sizes of data chunks mirrored from the primary system to the pre-stage storage means 22 are for example not larger than 0.1% to 10%. So in the first case of 0.1% about 750 writes can be done from scratch until the trigger criterion is TRUE, whereas the second case is limited to 7 writes only. The trigger determination depends thus also quite sensibly from the write frequency occurring in the primary system. In the NO case of decision 430 control is fed back to step 410 in order to reenter this loop.

In the YES branch of step 430 the data stored in the pre-stage storage means 22 is propagated to the secondary storage subsystem 19. In particular, this is the second phase, the actual "mirroring phase" in which the data is mirrored and stored on the secondary disk storage itself. After completion the data stored in the Mirror Disk Pre-stage storage means 22 is deleted in order to begin a further power-save phase and to receive the data again from the primary storage system.

The pre-stage storage means 22 should have a capacity of at least a few percent of the total disk storage capacity. The preferred capacity depends on the actual conditions of each individual use case. Preferably, hard disks will be used to build up the pre-stage storage means.

Figure 4B:
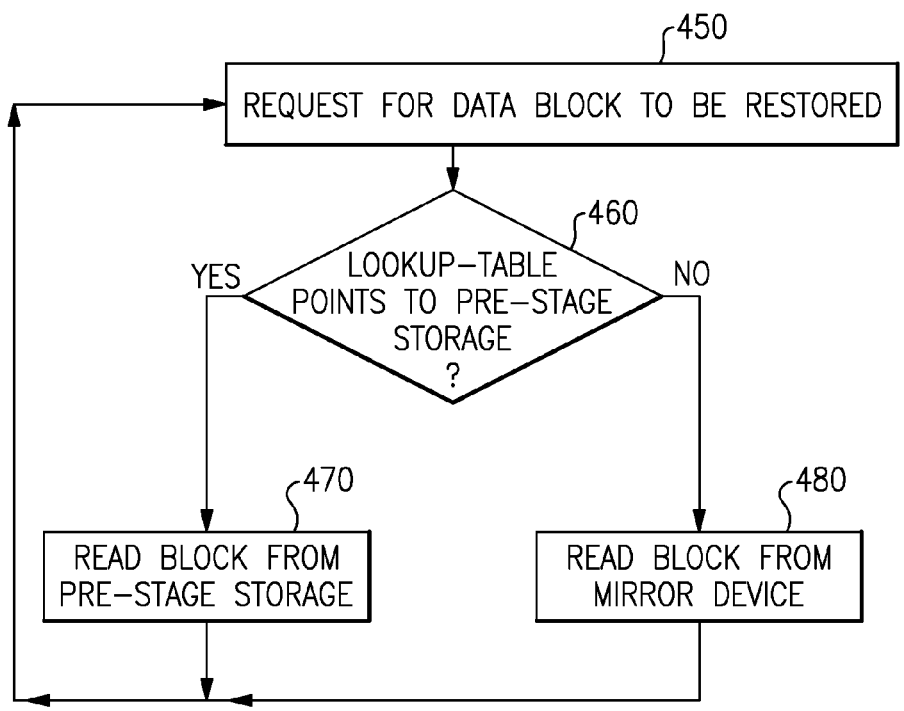

FIG. 4B illustrates the emergency case in which the mirrored data is actually required to be restored from the secondary system.

A request issued by some application 12 or the file system of the primary disk system for restoring some business data is received by the controller 32, see step 450.

The controller accesses the look up table used for managing the actual location of data, which may be either the secondary storage subsystem 19 for older data, or the pre-stage storage means 22 for younger data more recently mirrored from the primary storage subsystem.

As the lookup table contains the storage location for the currently requested block, a respective decision yields which enables for a selective read access, either from the pre-stage storage means 22, see step 470, or from the secondary storage subsystem 19. After the read has been completed, control is fed back to step 450, in order to be ready to response to new read requests.

The novel method and system can be extended to use disk virtualization facilities within a network instead of a dedicated storage device combining the components 19, 2 22, and 32 into one device. As an example, the Applicant provides the "IBM System Storage SAN Volume Controller" (SVC).

Figure 5:
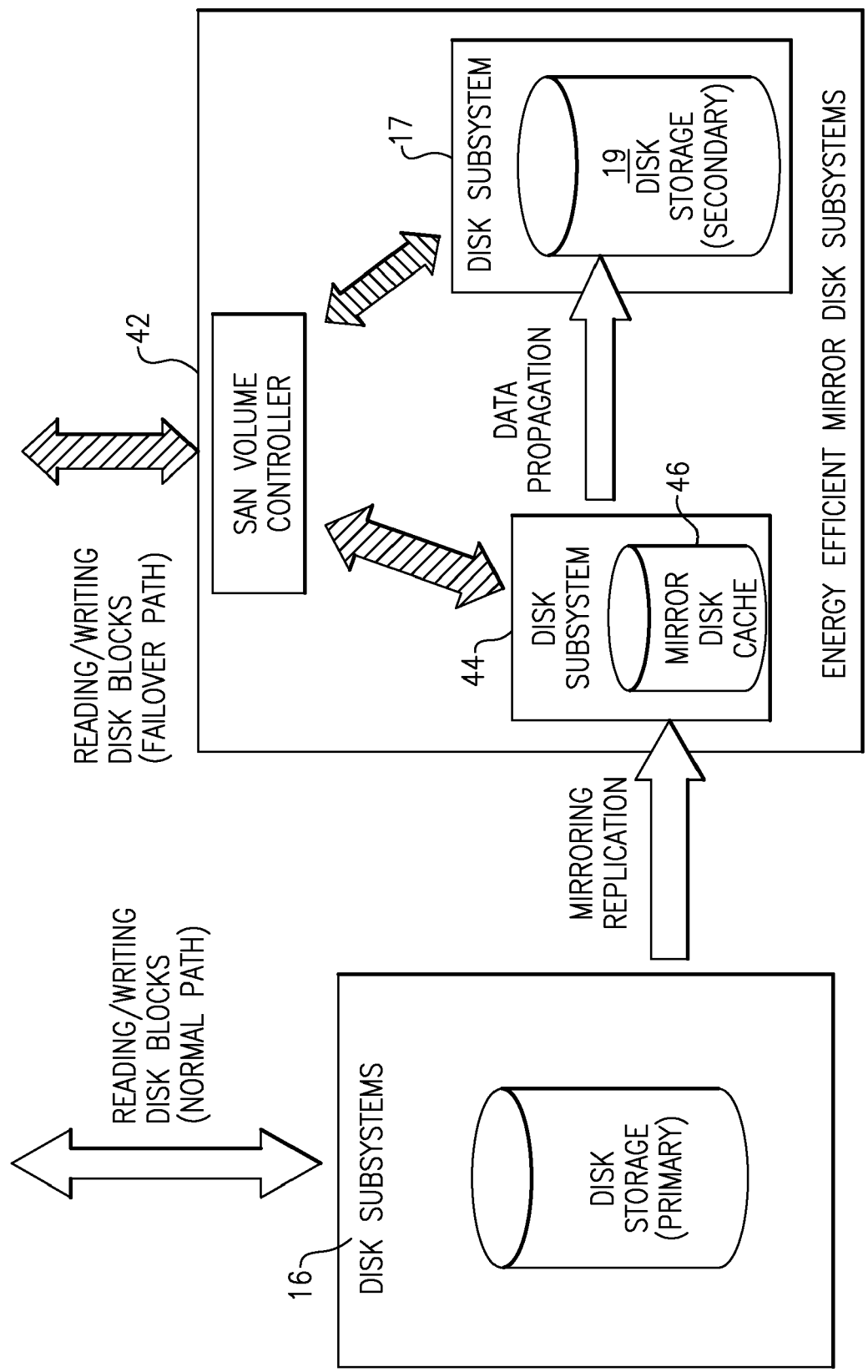
FIG. 5 illustrates the most basic structural components of a novel hardware and software environment used for a preferred embodiment of the novel method implementing a SAN volume controller as device controller.

FIG. 5 shows a schematic depiction of a system implementing a Mirror Disk Pre-stage storage means 46 by using a SAN Volume Controller as a virtualization facility.

Striping of data is common practice in disk storage for gaining performance over multiple hard disks. Furthermore, introducing redundancy in the hard disk array protects data from single disk drive failures. Choosing one or both concepts for the disk layout defines the associated RAID level (RAID=Redundant Array of Inexpensive Disks). Also, the novel Mirror Disk Pre-stage storage means 22 can use a certain RAID level if enough hard disks are being used. So introducing a Mirror Disk Pre-stage storage means 22 will focus mainly on arrays containing hundreds of hard disks building up the secondary disk storage. In this case, a few disk drives can build up the pre-stage storage means 22.

The effect of saving power increases with long time intervals during which the disk drives contained in the secondary disk storage system are turned off; this effect also increases with short intervals of propagating the data from the pre-stage storage means to disk storage.

As an example, the pre-stage storage means 22 uses only 5% of the power of the hard disks of the secondary disk storage system 19 and propagates the pre-stage storage means data within five minutes after one hour of inactivity (1:12 ratio). Compared to 100% power consumption of a device without pre-stage storage means, this results into 13.3% (5 min. á 105% plus 55 min. d of 5%) overall power consumption with a reduction of 86.7% power.

This demonstrates the importance of a short time for propagating the data. As additional investment for hardware of the pre-stage storage means is required upfront, the total cost of ownership only becomes attractive if this duration is relatively short compared to duration of inactivity of the secondary disk storage.

Figure 6:
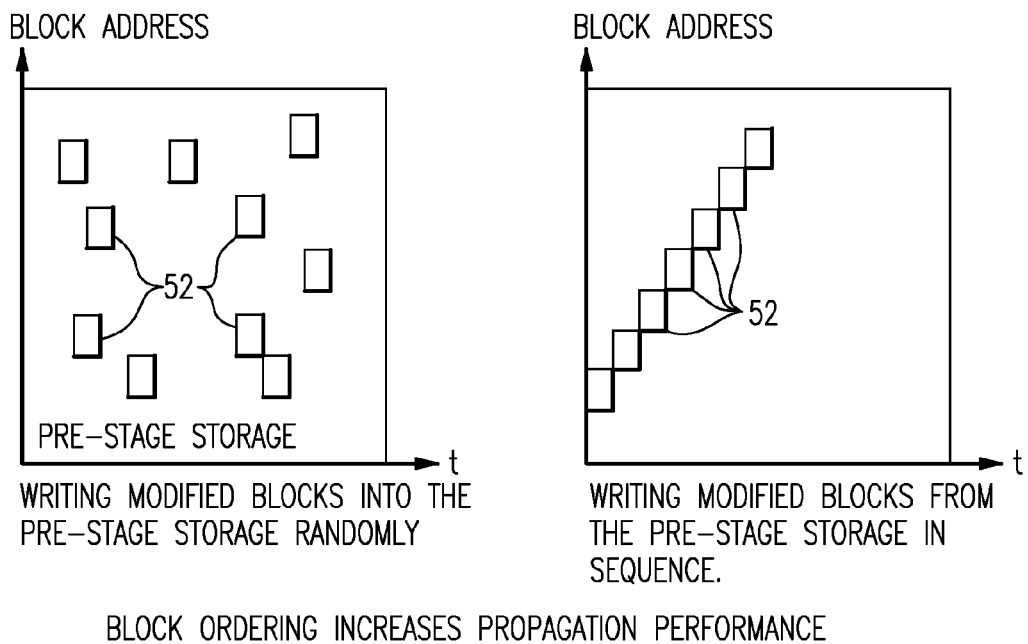
FIG. 6 illustrates an additional feature of block ordering in order to increase mirroring performance.
Figure 7:
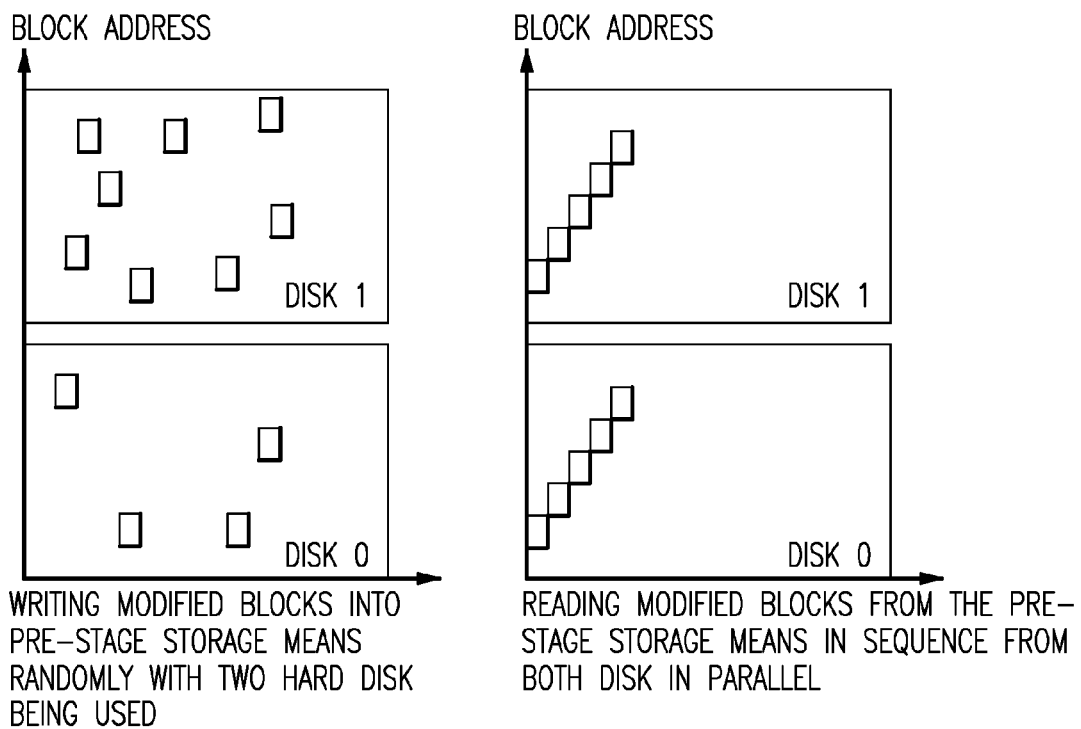
FIG. 7 illustrates an additional feature of block ordering combined with prior art "striping" the novel Mirror Disk Pre-stage storage means in order to increase mirroring performance.
Figure 8:
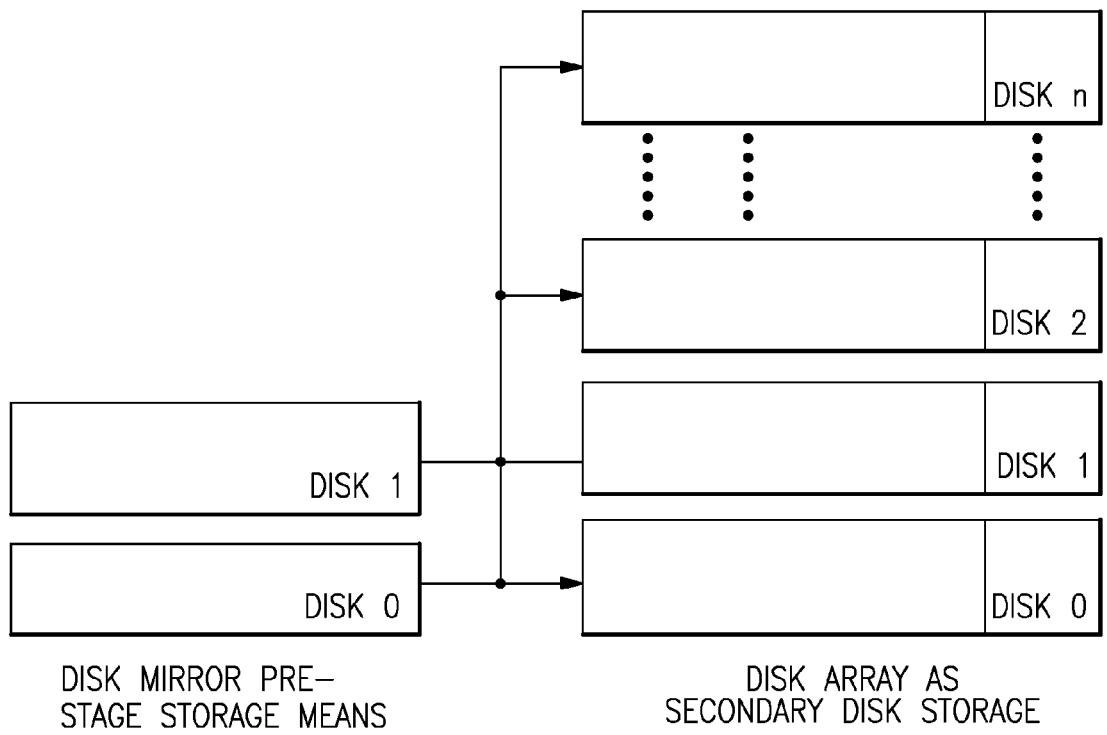
FIG. 8 illustrates details of striping the novel Mirror Disk Pre-stage storage means.

Next, additional preferred features are described with additional reference to FIGS. 6, 7 and 8, which can be applied in order to enrich the before described basic novel method.

FIG. 6 illustrates the sorting of blocks 52 being written to the Mirror Disk Pre-stage storage means 22 into a sequence in ascending order of block addresses.

The duration required for the data propagation can be reduced by sorting the sequence of blocks to be written to the secondary disk storage. If the random order of block addresses—see left part of FIG. 6—gets sorted in numerical order of the secondary system, the data can be read without large overhead for head movements of the hard disks being contained in the disk array, which is expressed in the right portion of FIG. 6.

This additional feature can be combined with another feature of transferring data in parallel, if the hard disks in the Mirror Disk pre-stage storage means 22 are associated to disk stripes within the secondary disk storage, which is illustrated in FIG. 7.

FIG. 7 illustrates how data blocks being written to the novel Mirror Disk Pre-stage storage means 22 onto two different hard disks get sorted for reading two sequences in parallel with ascending order of block addresses.

FIG. 8 illustrates the mapping of hard disks denoted as "0" and "1" of the Disk Mirror Pre-stage storage means to the disk array of the secondary disk storage resulting in parallel I/O paths for the data propagation.

As disk stripes usually are chosen depending on performance requirements for the storage system, the mapping from a stripe to a hard disk of the Mirror Disk Pre-stage storage means 22 must be chosen after setting up stripes. So the device controller managing the Mirror Disk Pre-stage storage means 22 must be aware of the striping layout. Preferably, the respective controller logic gets integrated into the device controller 32 of the storage device itself.

Next, some estimation is given for the extent of energy saving using the novel method and system:

A typical Enterprise storage server DS8000 Base Model 922 consumes 7 KVa/hour containing 128 disk drives. Together with an extension box 92E containing 256 disk drives an electrical power of 13.5 KVa/hour are consumed. With a price of 15 Cent per KVa/hour this sums up to 2$/hour or 17500$/year. If the air condition power ratio is 50% compared to the operating power the bill for the electric power sums up to 26300$/year for a single storage device. As a conservative assumption about 60% of the power cost (about 16000$) can be saved by applying an novel Mirror Disk Pre-stage storage means facility 22. For companies having dozens of storage devices the savings sum up to several 100,000's $ each year.

This does not take into account that the hard disk life time will be expanded by turning them off for a significant amount of time in the array of the secondary disk storage.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and pre-stage storage means memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

What is claimed is:

1. A method for reducing the power consumption of storage subsystems, wherein primary disk subsystem data are mirrored from a primary disk subsystem to a secondary mirror disk subsystem, the secondary mirror subsystem alternating between an operational phase and a power save phase according to a predetermined plan, the method comprising:

responsive to said secondary mirror disk subsystem being in a first state, mirroring said primary disk subsystem data to said secondary mirror disk subsystem without accumulating said primary disk subsystem data in a pre-stage storage, wherein said first state comprises said secondary mirror disk subsystem being in said operational phase; and responsive to said secondary mirror disk subsystem being in a second state, accumulating primary disk subsystem data to the pre-stage storage according to a predetermined mirroring policy, the pre-stage storage configured to be substantially permanently operational, wherein said second state comprises said secondary mirror disk subsystem being in said power-save phase; and responsive to a predetermined event, moving said accumulated mirrored primary disk subsystem data from said pre-stage storage to said secondary mirror disk subsystem, wherein the predetermined event includes moving the secondary mirror subsystem from the power save phase to the operational phase.

2. The method according to claim 1, wherein said pre-stage storage comprises a buffer having a configurable buffer size.

3. The method according to claim 1, wherein said storage subsystem comprises a RAID array consisting of the primary disk subsystem and the secondary mirror disk subsystem comprise.

4. The method according to claim 1, wherein said mirrored primary disk subsystem data to be moved to said secondary mirror disk subsystem is ordered in any one of an ascending or descending order of block addresses.

5. The method according to claim 1, wherein said data to be stored at said secondary mirror disk subsystem is propagated in parallel using striping methods.

6. The method according to claim 1, wherein the predetermined event comprises:
responsive to determining that any one of a predetermined time has elapsed or a predetermined amount of the pre-stage storage has been filled, moving the secondary mirror disk subsystem from the power save phase to the operational phase.

7. A controller for reducing the power consumption of storage subsystems, wherein primary disk subsystem data are mirrored from a primary disk subsystem to a secondary mirror disk subsystem, the secondary mirror subsystem alternating between an operational phase and a power save phase according to a predetermined plan, the controller configured to perform a method comprising:
responsive to said secondary mirror disk subsystem being in a first state, mirroring said primary disk subsystem data to said secondary mirror disk subsystem without accumulating said primary disk subsystem data in a pre-stage storage, wherein said first state comprises said secondary mirror disk subsystem being in said operational phase; and
responsive to said secondary mirror disk subsystem being in a second state, accumulating primary disk subsystem data to the pre-stage storage according to a predetermined mirroring policy, the pre-stage storage configured to be substantially permanently operational, wherein said second state comprises said secondary mirror disk subsystem being in said power-save phase; and
responsive to a predetermined event, moving said accumulated mirrored primary disk subsystem data from said pre-stage storage to said secondary mirror disk subsystem, wherein the predetermined event includes moving the secondary mirror subsystem from the power save phase to the operational phase.

8. The controller according to claim 7, wherein said pre-stage storage comprises a buffer having a configurable buffer size.

9. The controller according to claim 7, wherein said storage subsystem comprises a RAID array consisting of the primary disk subsystem and the secondary mirror disk subsystem comprise.

10. The controller according to claim 7, wherein said mirrored primary disk subsystem data to be moved to said secondary mirror disk subsystem is ordered in any one of an ascending or descending order of block addresses.

11. The controller according to claim 7, wherein said data to be stored at said secondary mirror disk subsystem is propagated in parallel using striping methods.

12. The controller according to claim 7, wherein the predetermined event comprises:
responsive to determining that any one of a predetermined time has elapsed or a predetermined amount of the pre-stage storage has been filled, moving the secondary mirror disk subsystem from the power save phase to the operational phase.

13. A computer program product for reducing the power consumption of storage subsystems, wherein primary disk subsystem data are mirrored from a primary disk subsystem to a secondary mirror disk subsystem, the secondary mirror subsystem alternating between an operational phase and a power save phase according to a predetermined plan, the computer program product comprising a non-transitory computer storage medium encoded with computer readable code, wherein the computer readable code when executed on a computer causes the computer to perform the method comprising:
responsive to said secondary mirror disk subsystem being in a first state, mirroring said primary disk subsystem data to said secondary mirror disk subsystem without accumulating said primary disk subsystem data in a pre-stage storage, wherein said first state comprises said secondary mirror disk subsystem being in said operational phase; and
responsive to said secondary mirror disk subsystem being in a second state, accumulating primary disk subsystem data to the pre-stage storage according to a predetermined mirroring policy, the pre-stage storage configured to be substantially permanently operational, wherein said second state comprises said secondary mirror disk subsystem being in said power-save phase; and
responsive to a predetermined event, moving said accumulated mirrored primary disk subsystem data from said pre-stage storage to said secondary mirror disk subsystem, wherein the predetermined event includes moving the secondary mirror subsystem from the power save phase to the operational phase.

14. The computer program product according to claim 13, wherein said pre-stage storage comprises a buffer having a configurable buffer size.

15. The computer program product according to claim 13, wherein said storage subsystem comprises a RAID array consisting of the primary disk subsystem and the secondary mirror disk subsystem comprise.

16. The computer program product according to claim 13, wherein said mirrored primary disk subsystem data to be moved to said secondary mirror disk subsystem is ordered in any one of an ascending or descending of block addresses.

17. The computer program product according to claim 13, wherein said data to be stored at said secondary mirror disk subsystem is propagated in parallel using striping methods.

18. The computer program product according to claim 13, wherein the predetermined event comprises:
responsive to determining that any one of a predetermined time has elapsed or a predetermined amount of the pre-stage storage has been filled, moving the secondary mirror disk subsystem from the power save phase to the operational phase.

* * * * *